(12) United States Patent
Jiang et al.

(10) Patent No.: US 12,217,585 B1
(45) Date of Patent: Feb. 4, 2025

(54) ASPIRATED SMOKE FIRE DETECTOR, FIRE PROTECTION SYSTEM, AIRFLOW DETECTION CIRCUIT AND METHOD

(71) Applicants: BEIJING JADE BIRD UNIVERSAL FIRE PROTECTION SYSTEM SOFTWARE SERVICE CO., LTD., Beijing (CN); Jade Bird Fire Co., Ltd., Beijing (CN)

(72) Inventors: Xuemei Jiang, Beijing (CN); Yajie Wang, Beijing (CN)

(73) Assignees: BEIJING JADE BIRD UNIVERSAL FIRE PROTECTION SYSTEM SOFTWARE SERVICE CO., LTD., Beijing (CN); JADE BIRD FIRE CO., LTD., Beijing (CN)

( * ) Notice: Subject to any disclaimer, the term of this patent is extended or adjusted under 35 U.S.C. 154(b) by 0 days.

(21) Appl. No.: 18/818,994

(22) Filed: Aug. 29, 2024

(30) Foreign Application Priority Data

May 31, 2024 (CN) .......................... 202410702822.8

(51) Int. Cl.
*G08B 17/10* (2006.01)
*G08B 17/06* (2006.01)
(52) U.S. Cl.
CPC ............. *G08B 17/06* (2013.01); *G08B 17/10* (2013.01)
(58) Field of Classification Search
CPC .......... A24F 40/40; A24F 40/46; A24F 40/50; A24F 40/53; A24F 40/90; B01D 46/466;
(Continued)

(56) References Cited

U.S. PATENT DOCUMENTS 6,539,791 B1 * 4/2003 Weber .................. G01F 1/6986
73/204.14

FOREIGN PATENT DOCUMENTS

| CA | 3081288 A1 * | 12/2004 | ............ A61M 16/00 |
| CN | 208872342 U * | 5/2019 | ............ G01D 21/02 |

(Continued)

*Primary Examiner* — Stephen R Burgdorf
(74) *Attorney, Agent, or Firm* — Meunier Carlin & Curfman LLC (57) ABSTRACT

The present disclosure provides an airflow detection circuit, wherein the airflow detection circuit includes: a first thermistor, one terminal of the first thermistor being coupled to a first resistor and a first switch, and the other terminal of the first thermistor being coupled to a first input terminal of a first operational amplifier; a second thermistor, one terminal of the second thermistor being coupled to the first resistor and the first switch, and the other terminal of the second thermistor being coupled to a second input terminal of the first operational amplifier; a voltage source, coupled to the first resistor and the first switch and configured to provide a supply voltage for the first thermistor and the second thermistor through a corresponding supply path based on ON or OFF of the first switch; and a controller, coupled to an output terminal of the first operational amplifier and configured to collect an output signal of the first operational amplifier and determine an airflow flow rate based on the output signal. The airflow detection circuit of the present disclosure senses a temperature through the first thermistor and the second thermistor and determines the airflow flow rate through the output signal of the first operational amplifier, thereby improving the stability, reliability and universality of airflow detection results.

20 Claims, 6 Drawing Sheets

(58) Field of Classification Search
CPC ........ B01D 46/488; G01K 1/026; G01K 7/01; G01K 7/24; G01K 7/25; G01K 40/53; G05B 19/0423; G05D 23/24; G08B 17/06; G08B 17/10; H02M 1/32; H02M 1/327; Y02E 60/10
USPC ........................................................ 340/584
See application file for complete search history.

(56) References Cited

FOREIGN PATENT DOCUMENTS

| | | | | | |
|---|---|---|---|---|---|
| CN | 111323090 A | * | 6/2020 | ........... | G01F 1/6845 |
| WO | WO-2023020362 A1 | * | 2/2023 | ............... | G01F 1/69 |

* cited by examiner

ASPIRATED SMOKE FIRE DETECTOR, FIRE PROTECTION SYSTEM, AIRFLOW DETECTION CIRCUIT AND METHOD

TECHNICAL FIELD

The present disclosure generally relates to the field of fire protection and, in particular, to an airflow detection circuit, an airflow detection method, an aspirated smoke fire detector, and a fire protection system.

BACKGROUND

Some of the existing aspirated smoke fire detectors use ultrasonic waves for detection, and due to the presence of the Doppler effect generated when the ultrasonic wave encounters an airflow while propagating in the gas, the speed and direction of the airflow are determined by measuring the Doppler frequency shift of the ultrasonic wave. However, the aforementioned detection method has some defects. For example, the stability, reliability and universality of detection results are poor. How to improve the stability, reliability and universality of the detection results of an aspirated smoke fire detector is a need for improvement in the field of fire protection.

The content in the Background is merely techniques known to the inventors and does not necessarily represent the prior art in the field.

SUMMARY

In response to one or more of the problems in the prior art, the present disclosure provides an airflow detection circuit that can improve the stability, reliability and universality of the detection results of an aspirated smoke fire detector.

The airflow detection circuit includes:
- a first thermistor, wherein one terminal of the first thermistor is coupled to a first resistor and a first switch, and the other terminal of the first thermistor is coupled to a first input terminal of a first operational amplifier;
- a second thermistor, wherein one terminal of the second thermistor is coupled to the first resistor and the first switch, and the other terminal of the second thermistor is coupled to a second input terminal of the first operational amplifier;
- a voltage source, coupled to the first resistor and the first switch and configured to provide a supply voltage for the first thermistor and the second thermistor through a corresponding supply path based on ON or OFF of the first switch; and
- a controller, coupled to an output terminal of the first operational amplifier and configured to collect an output signal of the first operational amplifier and determine an airflow flow rate based on the output signal.

Optionally, when the first switch is OFF, the voltage source is configured to provide a supply voltage for the first thermistor and the second thermistor through the first resistor.

Optionally, when the first switch is ON, the voltage source is configured to provide a supply voltage for the first thermistor and the second thermistor through the first switch.

Optionally, the airflow detection circuit further includes a second operational amplifier, wherein a first input terminal of the second operational amplifier is coupled to the first thermistor, and a second input terminal of the second operational amplifier is coupled to the second thermistor.

Optionally, the airflow detection circuit further includes a second switch, wherein the second switch is coupled to an output terminal of the second operational amplifier and the first switch and configured to control the first switch to be ON or OFF based on an output signal of the second operational amplifier.

Optionally, the second switch is ON when the output signal of the second operational amplifier is higher than a first threshold; the first switch is ON when the second switch is ON.

Optionally, the second switch is OFF when the output signal of the second operational amplifier is lower than a second threshold; the first switch is OFF when the second switch is OFF.

Optionally, the first switch includes a metal-oxide-semiconductor field-effect transistor, the second switch includes a bipolar junction transistor, and a collector of the bipolar junction transistor is coupled to a gate of the first switch.

Optionally, the thermistor includes a platinum resistance thermometer; the first thermistor includes a PT100; the second thermistor includes a PT1000.

Optionally, the controller is configured to determine a duty cycle of the output signal of the first operational amplifier and determine the airflow flow rate based on the duty cycle.

Optionally, the controller is configured to determine the airflow flow rate based on a duty cycle-flow rate mapping table.

Optionally, the controller is coupled to a master controller, and the controller is configured to determine a state of a detected pipe based on the airflow flow rate and feed the state back to the master controller.

Optionally, the airflow detection circuit further includes a second resistor, a third resistor and a fourth resistor, wherein the second resistor is coupled to the first thermistor, the third resistor and the fourth resistor are connected in series and coupled to the second thermistor, and the second resistor, the third resistor and the fourth resistor meet the following relationship:

$$\frac{V_{CC} - V_{DS}}{R_{PT1} + T \times \Delta R_{PT1} + R2} \times R2 = \frac{V_{CC} - V_{DS}}{R_{PT2} + T \times \Delta R_{PT2} + R3 + R4} \times R4$$

wherein $V_{CC}$ denotes a voltage of the voltage source, $V_{DS}$ denotes an on-state voltage drop of the first switch, $R_{PT1}$ denotes a resistance of the first thermistor, $R_{PT2}$ denotes a resistance of the second thermistor, $\Delta R_{PT1}$ denotes a change in the resistance of the first thermistor with temperature, $\Delta R_{PT2}$ denotes a change in the resistance of the second thermistor with temperature, T denotes a temperature, R2 denotes a resistance of the second resistor, R3 denotes a resistance of the third resistor, and R4 denotes a resistance of the fourth resistor.

Optionally, the airflow detection circuit further includes a fifth resistor, a sixth resistor, a seventh resistor, an eighth resistor, a ninth resistor, a tenth resistor and an eleventh resistor, wherein one terminal of the fifth resistor is coupled to the first resistor and the first switch, and the other terminal of the fifth resistor is coupled to a collector of the second switch; one terminal of the sixth resistor is coupled to the output terminal of the second operational amplifier, and the other terminal of the sixth resistor is coupled to a base of the second switch; one terminal of the seventh resistor is coupled between the sixth resistor and the base of the second switch, and the other terminal of the seventh resistor is coupled to an emitter of the second switch; one terminal of the eighth resistor is coupled to the output terminal of the first operational amplifier, and the other terminal of the eighth resistor is coupled to the controller; one terminal of the ninth resistor is coupled between the eighth resistor and the controller, and the other terminal of the ninth resistor is grounded; one terminal of the tenth resistor is coupled to the second input terminal of the first operational amplifier, and the other terminal of the tenth resistor is coupled between the output terminal of the first operational amplifier and the eighth resistor; one terminal of the eleventh resistor is coupled to the second input terminal of the first operational amplifier, and the other terminal of the eleventh resistor is grounded.

Optionally, the airflow detection circuit further includes a first capacitor, a second capacitor, a third capacitor and a fourth capacitor, wherein one terminal of the first capacitor is coupled between the first thermistor and the first input terminal of the second operational amplifier, and the other terminal of the first capacitor is coupled to the emitter of the second switch; one terminal of the second capacitor is coupled between the third resistor and the fourth resistor and coupled to the second input terminal of the second operational amplifier, and the other terminal of the second capacitor is coupled to the emitter of the second switch; the third capacitor is coupled in parallel to the seventh resistor, one terminal of the third capacitor is coupled to the base of the second switch, and the other terminal of the third capacitor is coupled to the emitter of the second switch; the fourth capacitor is coupled in parallel to the ninth resistor, and the other terminal of the fourth capacitor is grounded.

The present disclosure also provides an aspirated smoke fire detector, including the airflow detection circuit described above.

The present disclosure also provides a fire protection system, including:
  a master controller; and
  the aspirated smoke fire detector described above, communicatively connected to the master controller and configured to detect an airflow flow rate, determine a state of a detected pipe based on the airflow flow rate and report the state to the master controller.

The present disclosure also provides an airflow detection method, including:
  collecting an airflow to be detected;
  collecting, based on the airflow to be detected, an output signal of an airflow detection circuit;
  determining, based on the output signal, a duty cycle; and
  determining, based on the duty cycle, an airflow flow rate;
  wherein the airflow detection method is performed by the aspirated smoke fire detector described above.

Optionally, the airflow detection method further includes: determining a state of a detected pipe based on the airflow flow rate and reporting the state to the master controller.

The present disclosure also provides a computer-readable storage medium including computer-executable instructions stored thereon, wherein the computer-executable instructions, when executed by a processor, cause the processor to perform the airflow detection method described above.

The airflow detection circuit of the present disclosure has a simple circuit, a simple algorithm and low requirements for the controller and meets both real-time and stability requirements. The airflow detection circuit can sense a temperature through the first thermistor and the second thermistor and determine the airflow flow rate through the output signal of the first operational amplifier, thereby improving the stability, reliability and universality of airflow detection results.

The airflow detection circuit of the present disclosure determines the airflow flow rate through a duty cycle of the output signal of the first operational amplifier and determines the state of a detected pipe based on the airflow flow rate, thereby improving the accuracy and reliability of detection results.

The airflow detection circuit of the present disclosure can control the supply path to the first thermistor and the second thermistor by controlling the second switch and the first switch through the output signal of the second operational amplifier, to reduce the adverse effect of the spike signal in the output signal of the first operational amplifier, such that the spiked operational amplifier output is converted into a uniform switch time; thus, the output signal of the first operational amplifier becomes more stable, the output signal collected by the controller becomes more stable, and the duty cycle of the output signal of the first operational amplifier can be determined more accurately, thereby improving the accuracy of airflow detection results.

BRIEF DESCRIPTION OF THE DRAWINGS

The drawings are used to provide a further understanding of the present disclosure, constitute a part of the specification, explain the present disclosure in conjunction with the embodiments of the present disclosure, and do not constitute a limitation on the present disclosure. In the drawings.

DETAILED DESCRIPTION

In the following, only some exemplary embodiments are briefly described. The described embodiments can be modified in various different ways without departing from the spirit or scope of this disclosure, as would be apparent to those skilled in the art. Accordingly, the drawings and descriptions are to be regarded as illustrative and not restrictive in nature.

In the description of this disclosure, it needs to be understood that the orientation or position relations denoted by such terms as "central" "longitudinal" "latitudinal"

"length" "width" "thickness" "above" "below" "front" "rear" "left" "right" "vertical" "horizontal" "top" "bottom" "inside" "outside" "clockwise" "counterclockwise" and the like are based on the orientation or position relations as shown in the accompanying drawings, and are used only for the purpose of facilitating description of this disclosure and simplification of the description, instead of indicating or suggesting that the denoted devices or elements must be oriented specifically, or configured or operated in a specific orientation. Thus, such terms should not be construed to limit this disclosure. In addition, such terms as "first" and "second" are only used for the purpose of description, rather than indicating or suggesting relative importance or implicitly indicating the number of the denoted technical features. Accordingly, features defined with "first" and "second" can, expressly or implicitly, include one or more of the features. In the description of this disclosure, "plurality" means two or more, unless otherwise defined explicitly and specifically.

In the description of this disclosure, it needs to be noted that, unless otherwise specified and defined explicitly, such terms as "installation" "coupling" and "connection" should be broadly understood as, for example, fixed connection, detachable connection, or integral connection; or mechanical connection, electrical connection or intercommunication; or direct connection, or indirect connection via an intermediary medium; or internal communication between two elements or interaction between two elements. For those skilled in the art, the specific meanings of such terms herein can be construed in light of the specific circumstances.

Herein, unless otherwise specified and defined explicitly, if a first feature is "on" or "beneath" a second feature, this can cover direct contact between the first and second features, or contact via another feature therebetween, other than the direct contact. Furthermore, if a first feature is "on", "above", or "over" a second feature, this can cover the case that the first feature is right above or obliquely above the second feature, or just indicate that the level of the first feature is higher than that of the second feature. If a first feature is "beneath", "below", or "under" a second feature, this can cover the case that the first feature is right below or obliquely below the second feature, or just indicate that the level of the first feature is lower than that of the second feature.

The disclosure below provides many different embodiments or examples so as to realize different structures described herein. In order to simplify the disclosure herein, the following will give the description of the parts and arrangements embodied in specific examples. Of course, they are only for the exemplary purpose, not intended to limit this disclosure. Besides, this disclosure can repeat a reference number and/or reference letter in different examples, and such repeat is for the purpose of simplification and clarity, which does not represent any relation among various embodiments and/or arrangements as discussed. In addition, this disclosure provides examples of various specific processes and materials, but those skilled in the art can also be aware of application of other processes and/or use of other materials.

Preferred embodiments of the present disclosure will be described in detail in conjunction with the drawings, and it should be understood that the preferred embodiments described herein are only intended to describe and explain the present disclosure and not to limit the present disclosure.

The present disclosure provides an airflow detection circuit that uses a thermistor to indirectly detect the flow rate of the airflow by measuring the cooling effect of the airflow on the surface of the thermistor. The details will be described below.

Figure 1:
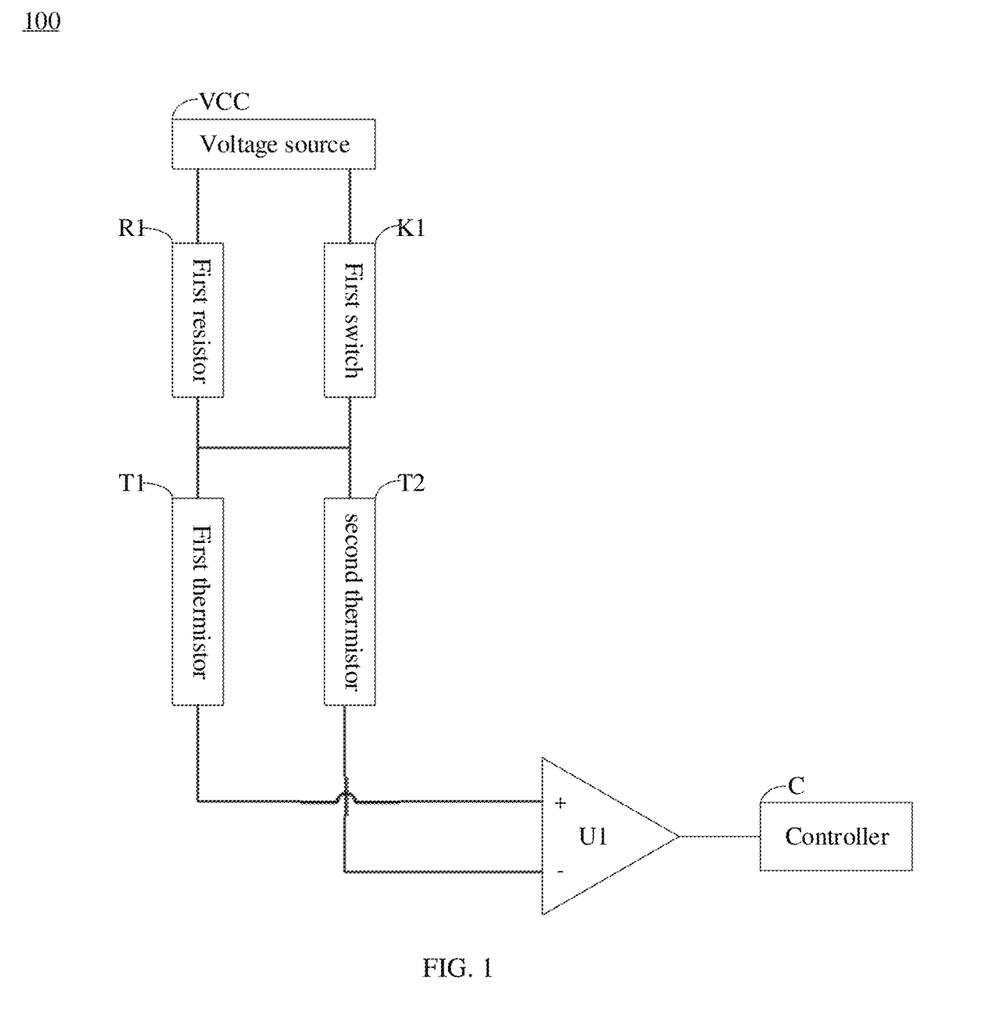
FIG. 1 shows a schematic block diagram of an airflow detection circuit according to some embodiments of the present disclosure.

FIG. 1 shows a schematic block diagram of an airflow detection circuit according to some embodiments of the present disclosure. As shown in FIG. 1, the airflow detection circuit 100 includes a voltage source VCC, a first resistor R1, a first switch K1, a first thermistor T1, a second thermistor T2, a first operational amplifier U1 and a controller C. One terminal of the first thermistor T1 is coupled to the first resistor R1 and the first switch K1, and the other terminal of the first thermistor T1 is coupled to a first input terminal (for example, a positive input terminal) of the first operational amplifier U1. One terminal of the second thermistor T2 is coupled to the first resistor R1 and the first switch K1, and the other terminal of the second thermistor T2 is coupled to a second input terminal (for example, a negative input terminal) of the first operational amplifier U1. The voltage source VCC is coupled to the first resistor R1 and the first switch K1 and may provide a supply voltage for the first thermistor T1 and the second thermistor T2 through a corresponding supply path based on ON or OFF of the first switch K1. The controller C is coupled to an output terminal of the first operational amplifier U1 and may collect an output signal of the first operational amplifier U1, and determine an airflow flow rate based on the output signal of the first operational amplifier U1. The specific method of determining the airflow flow rate will be described below.

In some embodiments, the first resistor R1 may be used as a bias resistor. When the first switch K1 is OFF, the voltage source VCC provides a supply voltage for the first thermistor T1 and the second thermistor T2 through the first resistor R1. When the first switch K1 is ON, the voltage source VCC provides a supply voltage for the first thermistor T1 and the second thermistor T2 through the first switch K1.

Figure 2:
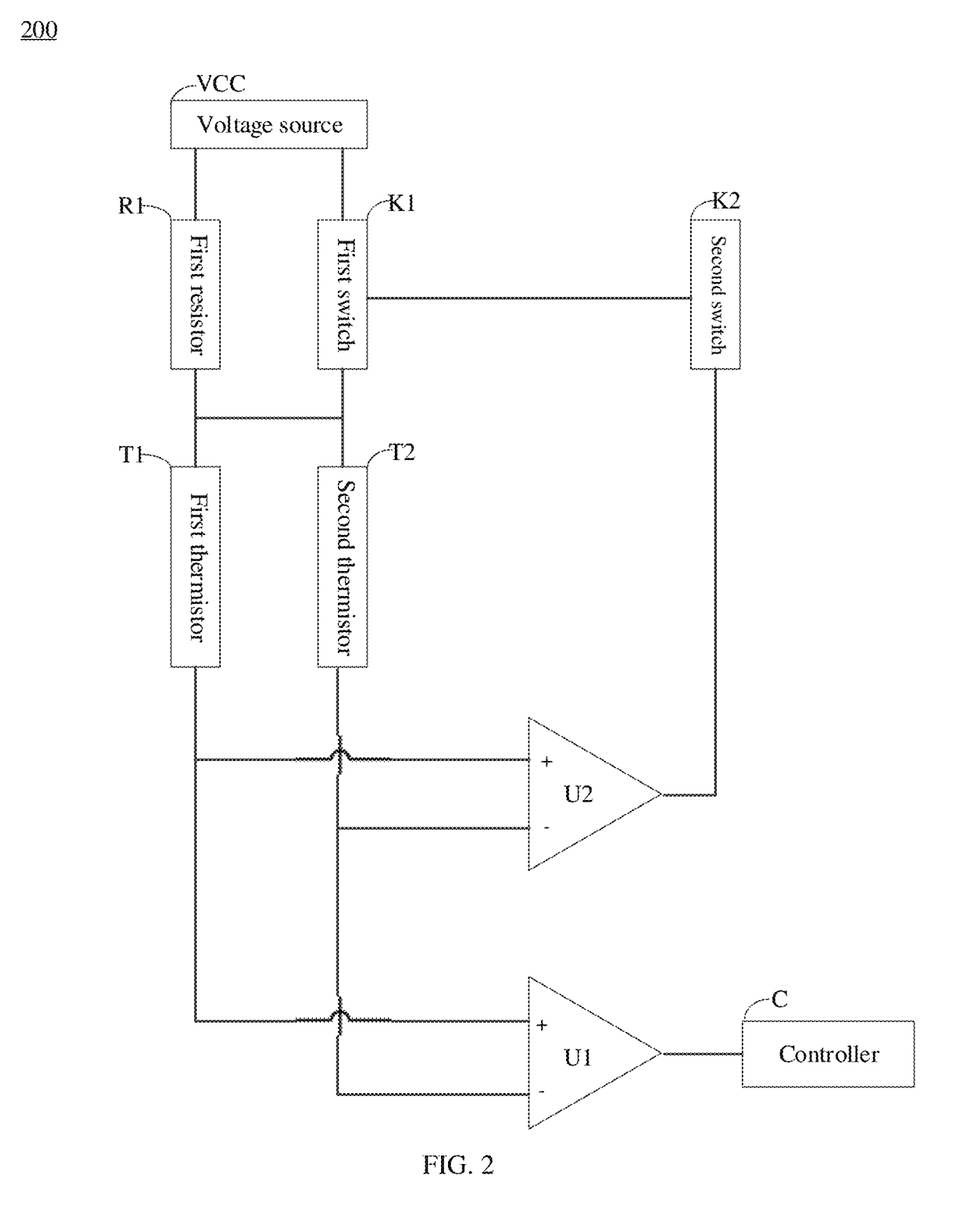
FIG. 2 shows a schematic block diagram of an airflow detection circuit according to some other embodiments of the present disclosure.

FIG. 2 shows a schematic block diagram of an airflow detection circuit according to some other embodiments of the present disclosure. As shown in FIG. 2, the airflow detection circuit 200 further includes a second operational amplifier U2. A first input terminal (for example, a positive input terminal) of the second operational amplifier U2 is coupled to the first thermistor T1, and a second input terminal (for example, a negative input terminal) of the second operational amplifier U2 is coupled to the second thermistor T2. The airflow detection circuit 300 further includes a second switch K2. The second switch K2 is coupled to an output terminal of the second operational amplifier U2 and the first switch K1, and may control the first switch K1 to be ON or OFF based on an output signal of the second operational amplifier U2. The second switch K2 is ON when the output signal of the second operational amplifier U2 is higher than a first threshold (for example, when the second operational amplifier U2 outputs a high level). The first switch K1 is ON when the second switch K2 is ON. The second switch U2 is OFF when the output signal of the second operational amplifier U2 is lower than a second threshold (for example, when the second operational amplifier U2 outputs a low level). The first threshold is greater than the second threshold. The first switch K1 is OFF when the second switch K2 is OFF.

In some embodiments, the first switch K1 includes a field-effect transistor (FET) switch, such as a metal-oxide-semiconductor field-effect transistor (MOSFET). Preferably, the first switch K1 may be a P-channel metal-oxide-semiconductor field-effect transistor (PMOS) or an N-channel metal-oxide-semiconductor field-effect transistor (NMOS). The first switch K1 may also be any other component that may serve an equivalent or similar purpose, including but not limited to switch components such as a bipolar junction transistor (BJT) and a relay.

In some embodiments, the second switch K2 includes a bipolar junction transistor (BJT). For example, the second switch K2 may be an NPN BJT or a PNP BJT. The second switch K2 may be any other component that may serve an equivalent or similar purpose, including but not limited to switch components such as a FET, a MOSFET, a PMOS, an NMOS and a relay.

Figure 3:
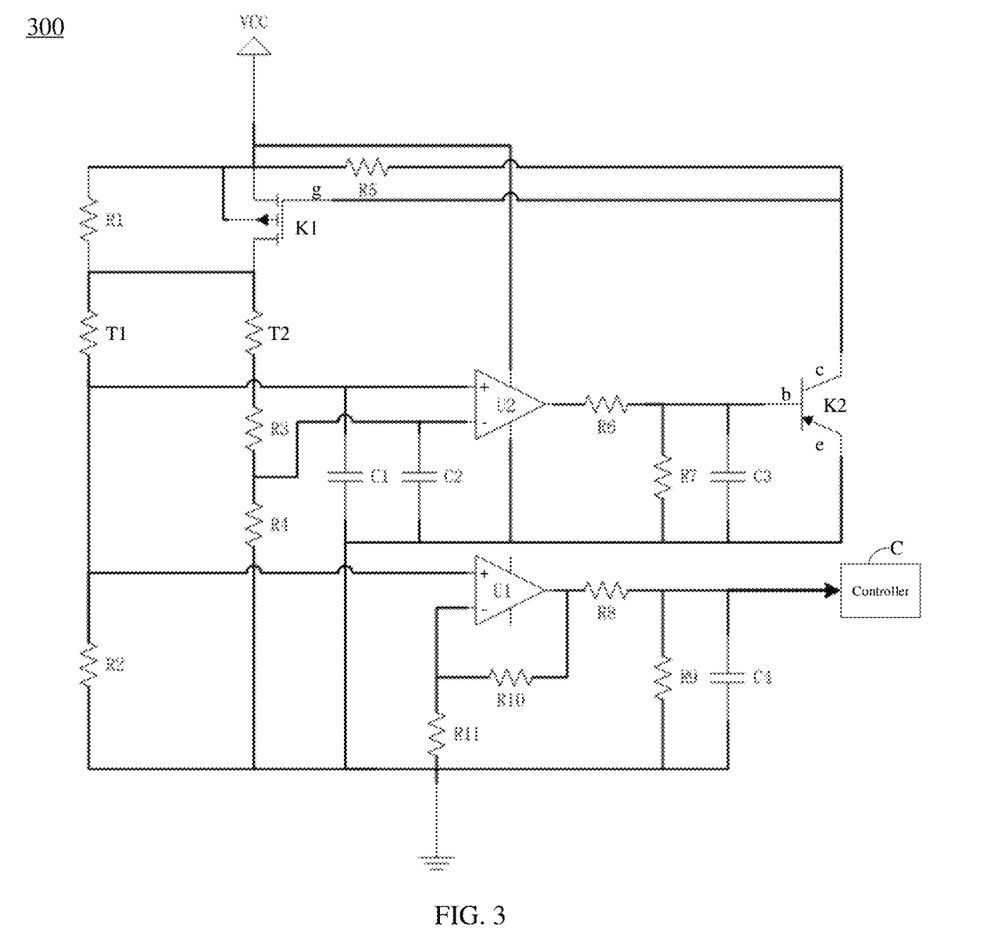
FIG. 3 shows a schematic circuit diagram of an airflow detection circuit according to some embodiments of the present disclosure.

FIG. 3 shows a schematic circuit diagram of an airflow detection circuit according to some embodiments of the present disclosure. As shown in FIG. 3, the first switch K1 adopts a MOSFET, the second switch K2 adopts a BJT, and the collector c of the second switch K2 is coupled to the gate g of the first switch K1. When the second switch K2 is ON, the second switch K2 may provide a drive voltage for the gate g of the first switch K1 and drive the first switch K1 to be ON.

In some embodiments, the first thermistor T1 and the second thermistor T2 each include a platinum resistance thermometer (PRT) or any other component that may serve an equivalent or similar purpose, including but not limited to a thermal diode, a thermal capacitor and the like. Preferably, the first thermistor T1 is a PT100 thermistor, and the second thermistor T2 is a PT1000 thermistor. It should be understood that when the first thermistor T1, the second thermistor T2, the first switch K1 and the second switch K2 adopted are of different types, the airflow detection circuit may be adaptively adjusted, and for example, some components may be appropriately added or reduced, depending on actual requirements.

When the temperature rises above a temperature conversion point, the resistances of the first thermistor T1 and the second thermistor T2 increase, the voltage across each of the first thermistor T1 and the second thermistor T2 increases, the voltages at the first input terminal and the second input terminal of at least one of the first operational amplifier U1 and the second operational amplifier U2 decrease, the voltage at the output terminal of at least one of the first operational amplifier U1 and the second operational amplifier decreases, and at least one of the first operational amplifier U1 and the second operational amplifier U2 outputs a low level.

When the temperature drops below the temperature conversion point, the resistances of the first thermistor T1 and the second thermistor T2 decrease, the voltage across each of the first thermistor T1 and the second thermistor T2 decreases, the voltages at the first input terminal and the second input terminal of at least one of the first operational amplifier U1 and the second operational amplifier U2 increase, the voltage at the output terminal of at least one of the first operational amplifier U1 and the second operational amplifier U2 increases, and at least one of the first operational amplifier U1 and the second operational amplifier U2 outputs a high level.

In some embodiments, as shown in FIG. 3, the airflow detection circuit 300 further includes a second resistor R2, a third resistor R3 and a fourth resistor R4, and the circuit connection relationship is shown in FIG. 3. The second resistor R2 is coupled to the first thermistor T1, and the third resistor R3 and the fourth resistor R4 are connected in series and coupled to the second thermistor T2. By reasonably setting the second resistor R2, the third resistor R3 and the fourth resistor R4, under an initial state of the airflow detection circuit 300 (for example, when the airflow detection circuit 300 is just powered up), the first input terminal (for example, a positive input terminal) of the second operational amplifier U2 is at a high potential (a high level), the second input terminal (for example, a negative input terminal) of the second operational amplifier U2 is at a low potential (a low level), and the output of the second operational amplifier U2 is a high level.

When the output of the second operational amplifier U2 is a high level, the second switch K2 is ON, the first switch K1 is ON, and the voltage source VCC provides a supply voltage for the first thermistor T1 and the second thermistor T2 through the first switch K1.

When the output of the second operational amplifier U2 is a low level, the second switch K2 is OFF, the first switch K1 is OFF, and the voltage source VCC provides a supply voltage for the first thermistor T1 and the second thermistor T2 through the first resistor R1.

In some embodiments, the temperature conversion point may be defined, and the temperature conversion point is a critical temperature at which the second operational amplifier U2 outputs a high level or a low level. When the temperature is lower than the temperature conversion point, the operational amplifier output of the second operational amplifier U2 is a high level. When the temperature is higher than the temperature conversion point, the operational amplifier output of the second operational amplifier U2 is a low level. When the temperature is equal to the temperature conversion point, the operational amplifier output of the second operational amplifier U2 maintains a previous or current level state.

In some embodiments, the second resistor R2, the third resistor R3 and the fourth resistor R4 meet the following relationship:

$$\frac{V_{CC} - V_{DS}}{R_{PT1} + T \times \Delta R_{PT1} + R2} \times R2 = \frac{V_{CC} - V_{DS}}{R_{PT2} + T \times \Delta R_{PT2} + R3 + R4} \times R4 \quad \text{(Formula 1)}$$

In the aforementioned formula, $V_{CC}$ denotes the voltage of the voltage source, $V_{DS}$ denotes an on-state voltage drop of the first switch K1, $R_{PT1}$ denotes the resistance of the first thermistor, $R_{PT2}$ denotes the resistance of the second thermistor, $\Delta R_{PT1}$ denotes a change in the resistance of the first thermistor with temperature, $\Delta R_{PT2}$ denotes a change in the resistance of the second thermistor with temperature, T is a temperature, R2 denotes the resistance of the second resistor, R3 denotes the resistance of the third resistor, R4 denotes the resistance of the fourth resistor, and T denotes the working temperature conversion point. It should be noted that the specific temperature of the working temperature conversion point T is not limited by the present disclosure and may be preset according to requirements in practical application.

Assuming that the temperature conversion point is set to be 70° C., the first thermistor T1 is selected as a PT100, and the second thermistor T2 is selected as a PT1000. When the temperature conversion point T is reached, then $R_{PT1} + T \times \Delta R_{PT1} = 127.49\Omega$, and $R_{PT2} + T \times \Delta R_{PT2} = 1270.751\ \Omega$ According to Formula 1, the following relationship is obtained:

$$\frac{R2}{127.49 + R2} = \frac{R4}{1270.751 + R3 + R4}$$

In this case, the resistances of the second resistor R2, the third resistor R3 and the fourth resistor R4 may be flexibly configured to meet the relationship of Formula 1.

It should be noted that the resistances of the second resistor R2, the third resistor R3 and the fourth resistor R4 may be selected at the same grade as those of the first thermistor T1 and the second thermistor T2 to avoid the powers of the first thermistor T1 and the second thermistor T2 from being greatly affected, such that the entire airflow detection circuit can work stably. For example, the second resistor R2 and the first thermistor T1 are of the same order of magnitude (for example, one hundred or hundreds of ohms), and the third resistor R3, the fourth resistor R4 and the second thermistor T2 are of the same order of magnitude (for example, one thousand or thousands of ohms).

It should be noted that, in Formula 1, all parameters except the temperature T are constants and may be flexibly configured according to the temperature requirements of an application scenario. In some embodiments, the resistance of the second resistor R2 is 130Ω, the resistance of the third resistor R3 is 200Ω, and the resistance of the fourth resistor R4 is 1500Ω.

In the present disclosure, the first thermistor and the second thermistor can sense the temperature change in the air flue. Since the airflow will have a cooling effect on the first thermistor and the second thermistor arranged in the air flue, a suitable voltage grade of the voltage source may be selected for the first thermistor and the second thermistor to ensure their powers, thereby avoiding the case that the working temperature conversion point cannot be reached when the temperature rise is offset by the temperature drop. In some embodiments, the voltage grade of the voltage source VCC may be 10 V to 20 V. However, the present disclosure is not limited thereto.

In some embodiments, the thermal sensitivity of the first thermistor T1 differs from the thermal sensitivity of the second thermistor T2. Since the second resistor R2 is coupled to the first thermistor T1, and the third resistor R3 and the fourth resistor R4 are connected in series and coupled to the second thermistor T2, by reasonably setting the resistances of the second resistor R2, the third resistor R3 and the fourth resistor R4, the ratio of the resistance of the first thermistor T1 to the sum of the resistances of the first thermistor T1 and the second resistor R2 changes faster than the ratio of the resistance of the second thermistor T2 to the sum of the resistances of the second thermistor T2, the third resistor R3 and the fourth resistor R4. In other words, T1/(T1+R2) changes faster with temperature than T2/(T2+R3+R4). For ease of reference, the aforementioned ratio is referred to as the resistance ratio hereinafter.

When the temperature of the surrounding airflow rises above the temperature conversion point, the resistance ratio of the first thermistor T1 (for example, a PT100) increases faster than the resistance ratio of the second thermistor T2 (for example, a PT1000) (specifically, although the surrounding temperature may make the resistance ratio of the first thermistor T1 increase slower than the resistance ratio of the second thermistor T2, the resistance ratio of the first thermistor T1 still increases faster than the resistance ratio of the second thermistor T2 because the total resistance of the branch of the first thermistor T1 is significantly smaller than the total resistance of the branch of the second thermistor T2 such that the thermal power generated by the current passing through the first thermistor T1 is significantly larger than the thermal power generated by the current passing through the second thermistor T2). The voltage at the first input terminal of the second operational amplifier U2 decreases faster than the voltage at the second input terminal of the second operational amplifier U2. When the voltage at the first input terminal of the second operational amplifier U2 is lower than the voltage at the second input terminal of the second operational amplifier U2, the operational amplifier output of the second operational amplifier U2 is a low level. In this case, the second switch K2 is OFF, the first switch K1 is OFF, and the voltage source VCC provides a supply voltage for the first thermistor T1 and the second thermistor T2 through the first resistor R1.

When the temperature drops below the temperature conversion point, the resistance ratio of the first thermistor T1 (for example, a PT100) decreases faster than the resistance ratio of the second thermistor T2 (for example, a PT1000). The voltage at the first input terminal of the second operational amplifier U2 increases faster than the voltage at the second input terminal of the second operational amplifier U2. When the voltage at the first input terminal of the second operational amplifier U2 is higher than the voltage at the second input terminal of the second operational amplifier U2, the operational amplifier output of the second operational amplifier U2 is a high level. In this case, the second switch K2 is ON, the first switch K1 is ON, and the voltage source VCC provides a supply voltage for the first thermistor T1 and the second thermistor T2 through the first switch K1.

In such a cycle, the second switch K2 may be turned on or off based on the high- or low-level signals outputted by the second operational amplifier U2, and thus the first switch K1 is controlled to be turned on or off, thereby achieving different supply paths of the voltage source VCC to the first thermistor T1 and the second thermistor T2.

It should be noted that when the temperature of the surrounding airflow is equal to the temperature conversion point, the first operational amplifier, the second operational amplifier, the first switch and the second switch maintain a previous or current state.

When the temperature does not reach the temperature conversion point (the temperature is lower than the temperature conversion point), the second operational amplifier U2 outputs a high level. The second switch K2 is ON, the first switch K1 is ON, and the voltage source VCC provides a supply voltage for the first thermistor T1 and the second thermistor T2 through the first switch K1. The first input terminal of the first operational amplifier U1 is inputted with a high level, and the first operational amplifier U1 outputs a high level. The controller C may collect the high level outputted by the first operational amplifier U1.

When the temperature reaches the temperature conversion point (the temperature is higher than the temperature conversion point), the second operational amplifier U2 outputs a low level. The second switch K2 is OFF, the first switch K1 is OFF, and the voltage source VCC provides a supply voltage for the first thermistor T1 and the second thermistor T2 through the first resistor R1. The first input terminal of the first operational amplifier U1 is inputted with a low level, and the first operational amplifier U1 outputs a low level. The controller C may collect the low level outputted by the first operational amplifier U1.

As can be seen, the temperature conversion point may be a critical temperature at which the first operational amplifier U1 outputs a high level or a low level.

In some embodiments, the controller C may collect an output voltage of the first operational amplifier U1, determine the resistance of the first thermistor T1 and the resistance of the second thermistor T2 based on the output voltage of the first operational amplifier U1, determine an airflow temperature or an airflow temperature change, and then determine an airflow flow rate. For example, when the output voltage of the first operational amplifier U1 is higher than a third threshold, it is determined that the resistance of the first thermistor T1 and the resistance of the second thermistor T2 are relatively small, the temperature is relatively low, and the airflow flow rate is relatively fast. When the output voltage of the first operational amplifier U1 is lower than a fourth threshold, it is determined that the resistance of the first thermistor T1 and the resistance of the second thermistor T2 are relatively large, the temperature is relatively high, and the airflow flow rate is relatively slow. The third threshold is greater than the fourth threshold. Optionally, the airflow temperature may be determined by using a temperature sensor. The temperature sensor may be coupled to or integrated into the controller.

In some preferred embodiments, the controller C may determine a duty cycle of the output signal of the first operational amplifier U1 and determine the airflow flow rate based on the duty cycle. For example, the controller C may read the high- and low-level pulse widths of the output signal of the first operational amplifier U1 through the input edge capture interruption, and calculate the duty cycle of a single pulse. When the duty cycle is higher than a fifth threshold (for example, 50%, 60%, etc.), it is determined that the airflow flow rate is relatively fast. When the duty cycle is lower than a sixth threshold (for example, 30%, 20%, etc.), it is determined that the airflow flow rate is relatively slow. The fifth threshold is greater than the sixth threshold.

Table 1 illustrates an example where the controller C determines a duty cycle based on the output signal of the first operational amplifier U1 according to some embodiments of the present disclosure.

TABLE 1

| Sampling pulse width (us) | Full pulse width (period, in us) | Duty cycle = pulse width*100%/full pulse width |
| --- | --- | --- |
| 51574 | 88218 | 58.4 |
| 52002 | 89828 | 57.8 |
| 50979 | 87597 | 58.1 |

As shown in Table 1, the sampling pulse width in the first column is the pulse width of the output signal of the first operational amplifier U1 collected by the controller C. The full pulse width in the second column is the full pulse width period. The duty cycle in the third column is the duty cycle of the output signal of the first operational amplifier U1.

The duty cycle is calculated in the following manner: duty cycle=pulse width*100%/full pulse width.

In some preferred embodiments, the controller C may process the output signal of the first operational amplifier U1 to obtain a stable duty cycle of the output signal, thereby improving the accuracy of airflow detection results. For example, the controller C may filter out the clutter from the output signal of the first operational amplifier U1 by using a median value, a mean value or the like, thereby improving the accuracy.

As shown in Table 1, for example, the mean duty cycle is (58.4+7.8+58.1)/3=58.1%. The mean pulse width period is (88218+89828+87597)/3=88.55 ms.

When the airflow flow rate becomes fast, the duty cycle increases (for example, to 61.29%), and the pulse width period is shortened (for example, to 83.76 ms). When the airflow flow rate becomes slow, the duty cycle decreases (for example, to 54.4%), and the pulse width period is lengthened (for example, to 91.89 ms). It should be understood that the full pulse width period is related to the first operational amplifier U1 and can have a certain margin. For example, the full pulse width period is allowed to vary in the range of 400 us to 200 ms. However, the present disclosure is not limited thereto, depending on actual requirements.

In some embodiments, the controller C may determine the airflow flow rate based on a duty cycle-flow rate mapping table of the output signal of the first operational amplifier U1.

In some embodiments, the duty cycle-flow rate (wind speed) mapping table may be established by using a standard wind speed table and through a large amount of experimental data.

In some embodiments, the controller C may be coupled to a fan (not shown in the figure). The rotation speed of the fan can be adjusted by adjusting the duty cycle of the fan, thereby achieving different wind speeds. When the duty cycle of the fan is relatively large, the rotation speed of the fan is relatively fast, and the wind speed is relatively fast. When the duty cycle of the fan is relatively small, the rotation speed of the fan is relatively slow, and the wind speed is relatively slow. The duty cycle of the fan may be 50% to 100%.

In some embodiments, in the case where the rotation speed of the fan (or the duty cycle of the fan) is fixed, the number of openings of the detected pipeline may be adjusted to achieve different wind speeds. The greater the number of openings of the detected pipeline, the faster the wind speed. The lower the number of openings of the detected pipeline, the slower the wind speed.

In some embodiments, the rotation speed of the fan (or the duty cycle of the fan) and the number of openings of the detected pipeline may be adjusted to achieve different wind speeds.

In some embodiments, multiple fans may be used to achieve different wind speeds, thereby improving efficiency.

In some embodiments, the controller C may collect the output voltage of the first operational amplifier U1 multiple times at different wind speeds, and determine the duty cycle of the output voltage, so as to establish a wind speed-duty cycle mapping table.

Preferably, the controller C may also fit the duty cycle to obtain a fitted duty cycle, which is conducive to establishing a more stable and reliable wind speed-duty cycle mapping relationship.

Figure 4:
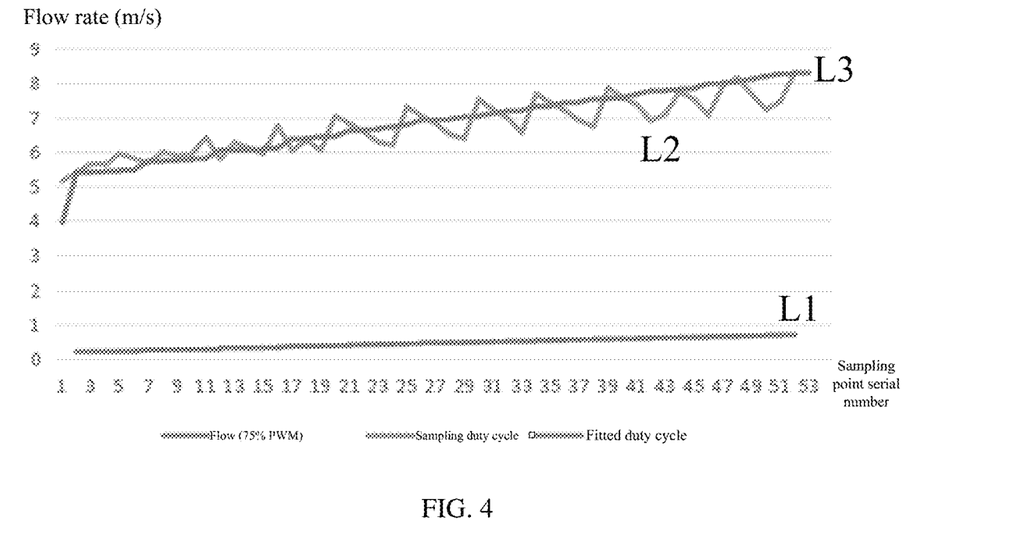
FIG. 4 shows a schematic diagram of mapping curves for flow rate, sampling duty cycle, and fitted duty cycle according to some embodiments of the present disclosure.

Table 2 illustrates a duty cycle-flow rate (wind speed) mapping table of the output signal of the first operational amplifier according to some embodiments of the present disclosure, and FIG. 4 shows a schematic diagram of mapping curves for flow rate, sampling duty cycle, and fitted duty cycle according to some embodiments of the present disclosure. As shown in Table 2, the first column is the flow rate (wind speed or flow). The second column is the sampling duty cycle, and the duty cycle is determined by the controller based on the output signal of the first operational amplifier U1. The third column is the fitted duty cycle, and the fitted duty cycle is a duty cycle obtained by the controller C fitting the sampling duty cycle. As shown in FIG. 4, the horizontal coordinate indicates the sampling point serial number, the vertical coordinate indicates the flow rate (m/s), the blue curve L1 indicates the flow rate; the grey curve L2 indicates the sampling duty cycle; and the green curve L3 indicates the fitted duty cycle. As can be seen from FIG. 4, each sampling point serial number corresponds to the sampling duty cycle and the fitted duty cycle vertically, and the flow rate is positively associated with the duty cycle overall.

When the duty cycle increases, the flow rate increases. When the duty cycle decreases, the flow rate decreases. Therefore, the airflow flow rate may be detected based on the duty cycle of the output signal of the first operational amplifier. It should be noted that FIG. 4 illustrates the flow rate (blue curve L1) when the duty cycle of the fan is 75% as an example, which does not constitute a limitation on the present disclosure.

TABLE 2

| Flow rate (wind speed or flow) (m/s) | Sampling duty cycle | Fitted duty cycle |
|---|---|---|
| 1.96 | 53.93 | 53.93 |
| 1.98 | 56.39 | 54.04729293 |
| 2.01 | 56.08 | 54.22323232 |
| 2.07 | 59.44 | 54.57511111 |
| 2.09 | 57.89 | 54.69240404 |
| 2.51 | 56.7 | 57.15555556 |
| 2.54 | 59.89 | 57.33149495 |
| 2.56 | 58.74 | 57.44878788 |
| 2.63 | 59.18 | 57.85931313 |
| 2.66 | 64.09 | 58.03525253 |
| 3.07 | 57.9 | 60.43975758 |
| 3.08 | 62.65 | 60.49840404 |
| 3.09 | 60.94 | 60.55705051 |
| 3.15 | 59.45 | 60.90892929 |
| 3.18 | 67.44 | 61.08486869 |
| 3.61 | 60.23 | 63.60666667 |
| 3.64 | 63.24 | 63.78260606 |
| 3.72 | 60.4 | 64.25177778 |
| 3.75 | 70.38 | 64.42771717 |
| 4.03 | 68.03 | 66.06981818 |
| 4.07 | 65.7 | 66.30440404 |
| 4.12 | 62.64 | 66.59763636 |
| 4.2 | 61.94 | 67.06680808 |
| 4.31 | 73.02 | 67.71191919 |
| 4.55 | 70.39 | 69.11943434 |
| 4.57 | 68.02 | 69.23672727 |
| 4.6 | 64.9 | 69.41266667 |
| 4.72 | 63.74 | 70.11642424 |
| 4.78 | 75.22 | 70.46830303 |
| 4.89 | 72.19 | 71.11341414 |
| 5.01 | 69.92 | 71.81717172 |
| 5.05 | 65.41 | 72.05175758 |
| 5.23 | 76.81 | 73.10739394 |
| 5.3 | 74.16 | 73.51791919 |
| 5.42 | 71.94 | 74.22167677 |
| 5.47 | 69.03 | 74.51490909 |
| 5.6 | 67.19 | 75.27731313 |
| 5.65 | 78.57 | 75.57054545 |
| 5.67 | 75.79 | 75.68783838 |
| 5.84 | 73.65 | 76.68482828 |
| 6 | 68.88 | 77.62317172 |
| 6.05 | 70.97 | 77.91640404 |
| 6.10 | 77.43 | 78.20963636 |
| 6.15 | 75.18 | 78.50286869 |
| 6.38 | 70.64 | 79.85173737 |
| 6.43 | 79.07 | 80.1449697 |
| 6.49 | 81.55 | 80.49684848 |
| 6.6 | 76.85 | 81.1419596 |
| 6.75 | 72.14 | 82.02165657 |
| 6.87 | 74.56 | 82.72541414 |
| 6.91 | 82.96 | 82.96 |

In some embodiments, the duty cycle-flow rate (wind speed) mapping table (for example, experimental data, a mapping table, mapping curves, etc.) may be stored in a memory. The controller may collect the output signal of the first operational amplifier, determine the duty cycle of the output signal, and invoke the stored duty cycle-flow rate (wind speed) mapping table to determine the airflow flow rate, thereby achieving airflow monitoring.

For example, when the controller determines that the duty cycle (for example, the fitted duty cycle) of the output signal of the first operational amplifier is 58.1%, it is known by looking up the duty cycle-flow rate mapping table that the airflow flow rate is about 2.66 m/s.

For another example, when the controller determines that the duty cycle (for example, the fitted duty cycle) of the output signal of the first operational amplifier is 66%, it is known by looking up the duty cycle-flow rate mapping table that the airflow flow rate is about 4.03 m/s.

In some embodiments, the controller C may be coupled to a master controller C0, and the controller C may determine the state of a detected pipe based on the airflow flow rate and feed the state back to the master controller C0.

In some embodiments, the controller C may determine the state of a detected pipe based on the magnitude relationship between the airflow flow rate and a threshold. For example, when the airflow flow rate is between a seventh threshold and an eighth threshold (for example, between 3.15 m/s and 6 m/s), the detected pipe is determined to be normal. For example, when the airflow flow rate is higher than the seventh threshold (for example, 6 m/s) and/or is lower than the eighth threshold (for example, 3.15 m/s), the detected pipe is determined to be abnormal. Specifically, when the airflow flow rate is higher than the seventh threshold (for example, 6 m/s), the detected pipe is determined to be cracked (broken); when the airflow flow rate is lower than the eighth threshold (for example, 3.15 m/s), the detected pipe is determined to be clogged (blocked). The seventh threshold is greater than the eighth threshold.

It should be noted that the specific magnitudes of the thresholds involved in the present disclosure may be flexibly adjusted according to actual requirements.

In some embodiments, the controller C may perform fault alarm based on the airflow flow rate. For example, when the airflow flow rate is lower than 20% of the eighth threshold (that is, the airflow flow rate is 80% or less of the lower limit of the normal flow rate), the controller C may perform low-airflow (pipe clogging or blockage) fault alarm. When the airflow flow rate is higher than 30% of the seventh threshold (that is, the airflow flow rate is 130% or more of the upper limit of the normal flow rate), the controller C may perform high-airflow (pipe cracking or breakage) fault alarm.

For example, the normal flow rate is 4 m/s. When the airflow flow rate is lower than 20% of the normal flow rate (that is, the airflow flow rate is 4 m/s*80%=3.24 m/s or lower), the controller C determines the detected pipe to be clogged and performs low-airflow (pipe clogging or blockage) fault alarm. When the airflow flow rate is higher than 30% of the normal flow rate (that is, the airflow flow rate is 4 m/s*130%=5.2 m/s or higher), the controller C determines the detected pipe to be cracked and performs high-airflow fault alarm.

Optionally, the controller C may perform hierarchical fault alarm based on the airflow flow rate. The hierarchical fault alarm may include three levels: minor fault alarm, general fault alarm and serious fault alarm. For example, when the airflow flow rate is lower than 0 to 20% of the eighth threshold, the controller C may perform minor fault alarm for low airflow (pipe clogging or blockage). When the airflow flow rate is lower than 20% to 50% of the eighth threshold, the controller C may perform general fault alarm for low airflow (pipe clogging or blockage). When the airflow flow rate is lower than 50% to 100% of the eighth threshold, the controller C may perform serious fault alarm for low airflow (pipe clogging or blockage). For another example, when the airflow flow rate is higher than 0 to 30% of the seventh threshold, the controller C may perform minor fault alarm for high airflow (pipe cracking or breakage).

When the airflow flow rate is higher than 30% to 50% of the seventh threshold, the controller C may perform general fault alarm for high airflow (pipe cracking or breakage). When the airflow flow rate is higher than 50% to 100% of the seventh threshold, the controller C may perform serious fault alarm for high airflow (pipe cracking or breakage).

Optionally, the hierarchical fault alarm may include two levels: abnormity alarm and fault alarm. For example, when the airflow flow rate is lower than 0 to 50% of the eighth threshold, the controller C may perform abnormity alarm for low airflow (pipe clogging or blockage). When the airflow flow rate is lower than 50% to 100% of the eighth threshold, the controller C may perform fault alarm for low airflow (pipe clogging or blockage). For another example, when the airflow flow rate is higher than 0 to 50% of the seventh threshold, the controller C may perform abnormity alarm for high airflow (pipe cracking or breakage). When the airflow flow rate is higher than 30% to 50% of the seventh threshold, the controller C may perform fault alarm for high airflow (pipe cracking or breakage). It should be noted that the specific levels of the hierarchical fault alarm and the corresponding threshold percentages are not limited by the present disclosure and may be set according to requirements in practical application. In addition, the specific values of the normal flow rate, the abnormal flow rate and the percentages are not limited by the present disclosure and may be set according to requirements in practical application, which is within the scope of protection of the present disclosure.

Figure 5:
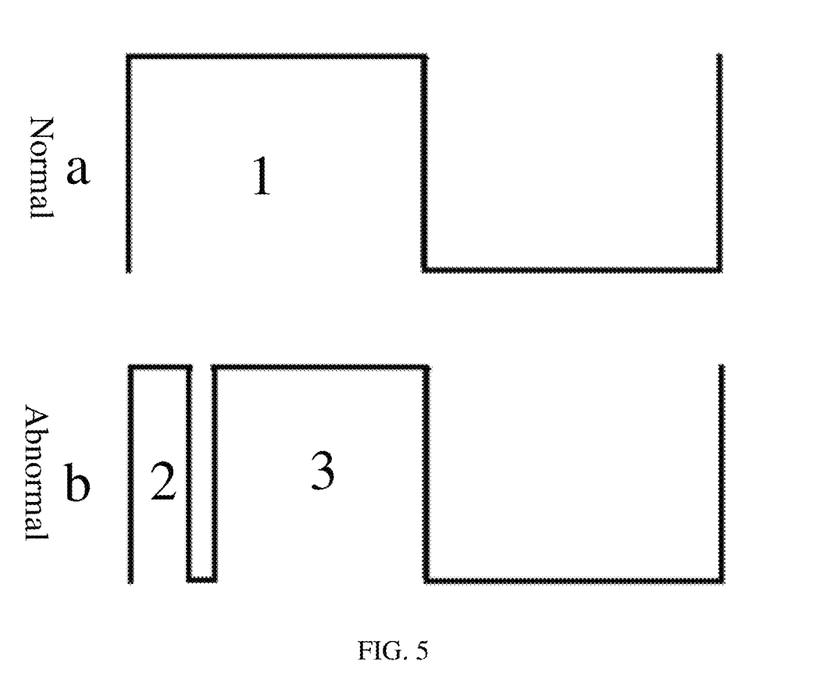
FIG. 5 shows a schematic diagram of whether the period of the output signal of the first operational amplifier is abnormal according to some embodiments of the present disclosure.

In some embodiments, the controller C may further monitor whether the period of the output signal of the first operational amplifier U1 is abnormal. For example, the controller C may determine, by monitoring whether the period of the output signal of the first operational amplifier U1 meets a calibration period, whether the period of the output signal of the first operational amplifier U1 is abnormal. When the controller C monitors that the period of the output signal of the first operational amplifier U1 meets the calibration period, the controller C determines that the period of the output signal of the first operational amplifier U1 is normal. When the controller C monitors that the period of the output signal of the first operational amplifier U1 does not meet the calibration period, for example, when the controller C monitors that the period of the output signal of the first operational amplifier U1 is less than half of the calibration period, the controller C preliminarily determines that the period of the output signal of the first operational amplifier U1 is abnormal. Preferably, the controller C may continuously monitor multiple periods of the output signal of the first operational amplifier U1 before the determination, and if the controller C monitors that the period of the output signal of the first operational amplifier U1 is still less than half of the calibration period, the controller C may determine that the period of the output signal of the first operational amplifier U1 is abnormal. Preferably, the controller C may perform compensation correction on the signal in the abnormal period. FIG. 5 shows a schematic diagram of whether the period of the output signal of the first operational amplifier is abnormal according to some embodiments of the present disclosure. Figure a in FIG. 5 illustrates an example where the period of the output signal of the first operational amplifier is normal. Figure b in FIG. 5 illustrates an example where the period of the output signal of the first operational amplifier is abnormal. During compensation correction, the controller may combine the pulse 2 and the pulse 3 and then perform compensation correction, thereby improving the accuracy of detection results.

As shown in FIG. 3, the airflow detection circuit 300 further includes a fifth resistor R5, a sixth resistor R6, a seventh resistor R7, an eighth resistor R8, a ninth resistor R9, a tenth resistor R10 and an eleventh resistor R11. One terminal of the fifth resistor R5 is coupled to the first resistor R1 and the first switch K1, and the other terminal of the fifth resistor R5 is coupled to the collector c of the second switch K2. One terminal of the sixth resistor R6 is coupled to the output terminal of the second operational amplifier U2, the other terminal of the sixth resistor R6 is coupled to the base b of the second switch K2, and the sixth resistor R6 is a current limiting resistor. One terminal of the seventh resistor R7 is coupled between the sixth resistor R6 and the base b of the second switch K2, and the other terminal of the seventh resistor R7 is coupled to the emitter e of the second switch K2. The seventh resistor R7 is a bias resistor and may provide a bias voltage for the base b of the second switch K2 to control the second switch K2 to be turned on. The collector c of the second switch K2 is coupled to the gate of the first switch K1. When the second switch K2 is ON, the second switch K2 provides a drive voltage for the gate g of the first switch K1. The gate of the first switch K1 receives an enable signal from the second switch K2, and the first switch K1 is turned on. The power voltage of the voltage source VCC is applied to the first thermistor T1 and the second thermistor T2 through the first switch K1. One terminal of the eighth resistor R8 is coupled to the output terminal of the first operational amplifier U1, and the other terminal of the eighth resistor R8 is coupled to the controller C. One terminal of the ninth resistor R9 is coupled between the eighth resistor R8 and the controller C, and the other terminal of the ninth resistor R9 is grounded. One terminal of the tenth resistor R10 is coupled to the second input terminal of the first operational amplifier U1, and the other terminal of the tenth resistor R10 is coupled between the output terminal of the first operational amplifier U1 and the eighth resistor R8. One terminal of the eleventh resistor R11 is coupled to the second input terminal of the first operational amplifier U1, and the other terminal of the eleventh resistor R11 is grounded.

In some embodiments, the controller C collects the voltage signal of the output terminal of the first operational amplifier U1. The voltage signal may be amplified through the tenth resistor R10 and the eleventh resistor R11 and then divided by the eighth resistor R8 and the ninth resistor R9, so that the output signal of the first operational amplifier U1 is adjusted to be in a voltage level that can be withstood by the controller C. The output terminal of the first operational amplifier U1 may be coupled to the sampling pin of the controller C. The controller C may detect the output signal of the first operational amplifier U1 in real time, calculate the duty cycle through the durations of the output signal of the first operational amplifier U1 in the high- and low-level states, and determine the flow rate information of the airflow according to the duty cycle-flow rate mapping table.

As shown in FIG. 3, the airflow detection circuit 300 further includes a first capacitor C1, a second capacitor C2, a third capacitor C3 and a fourth capacitor C4. One terminal of the first capacitor C1 is coupled between the first thermistor T1 and the first input terminal of the second operational amplifier U2, and the other terminal of the first capacitor C1 is coupled to the emitter e of the second switch K2. One terminal of the second capacitor C2 is coupled between the third resistor R3 and the fourth resistor R4 and coupled to the second input terminal of the second operational amplifier U2, and the other terminal of the second capacitor C2 is coupled to the emitter e of the second switch K2. The third capacitor C3 is coupled in parallel to the seventh resistor R7, one terminal of the third capacitor C3 is coupled to the base b of the second switch K2, and the other terminal of the third capacitor C3 is coupled to the emitter e of the second switch K2. The fourth capacitor C4 is coupled in parallel to the ninth resistor R9, one terminal of the fourth capacitor C4 is coupled to the output terminal of the eighth resistor R8, and the other terminal of the fourth capacitor C4 is grounded. The first capacitor C1, the second capacitor C2, the third capacitor C3 and the fourth capacitor C4 are filter capacitors. The specific capacitances are not limited by the present disclosure and may be flexibly adjusted according to the quality of the signal received by the controller C and the electromagnetic compatibility (EMC) effect.

The airflow detection circuit of the present disclosure has a simple circuit, a simple algorithm and low requirements for the controller and meets both real-time and stability requirements. The airflow detection circuit can sense a temperature through the first thermistor and the second thermistor and determine the airflow flow rate through the output signal of the first operational amplifier, thereby improving the stability, reliability and universality of airflow detection results.

The airflow detection circuit of the present disclosure determines the airflow flow rate through a duty cycle of the output signal of the first operational amplifier and determines the state of a detected pipe based on the airflow flow rate, thereby improving the accuracy and reliability of detection results.

The airflow detection circuit of the present disclosure can control the supply path to the first thermistor and the second thermistor by controlling the second switch and the first switch through the output signal of the second operational amplifier, to reduce the adverse effect of the spike signal in the output signal of the first operational amplifier such that the spiked operational amplifier output is converted into a uniform switch time; thus, the output signal of the first operational amplifier becomes more stable, the output signal collected by the controller becomes more stable, and the duty cycle of the output signal of the first operational amplifier can be determined more accurately, thereby improving the accuracy of airflow detection results.

Figure 6:
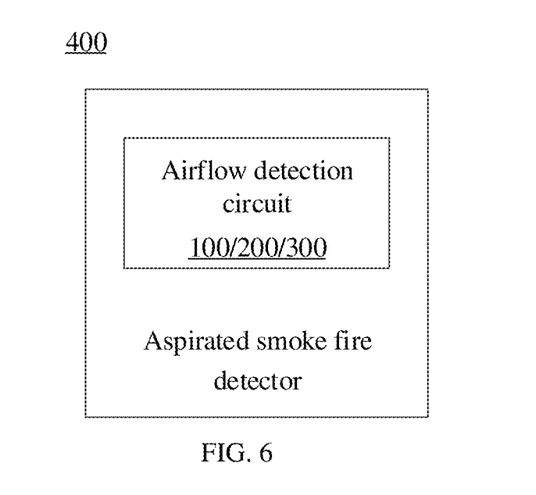
FIG. 6 shows a schematic diagram of an aspirated smoke fire detector according to some embodiments of the present disclosure.

The present disclosure further provides an aspirated smoke fire detector. FIG. 6 shows a schematic diagram of an aspirated smoke fire detector according to some embodiments of the present disclosure. As shown in FIG. 6, the aspirated smoke fire detector 400 includes the airflow detection circuit 100/200/300 described above. It should be understood that the aspirated smoke fire detector 400 may further include a housing, an aspirating pipe, a fan, a display screen, a speaker, a buzzer and the like which are not shown in the figure though. The aspirated smoke fire detector 400 may display airflow detection results through the fan, the display screen, the speaker, the buzzer and the like.

In some embodiments, the aspirated smoke fire detector 400 may detect an airflow flow rate, determine the state of a detected pipe based on the airflow flow rate and feed the state back to the master controller. For example, when the airflow flow rate is between a seventh threshold and an eighth threshold, the detected pipe is determined to be normal. When the airflow flow rate is higher than the seventh threshold and/or is lower than the eighth threshold, the detected pipe is determined to be abnormal. When the airflow flow rate is higher than the seventh threshold, the detected pipe is determined to be cracked; when the airflow flow rate is lower than the eighth threshold, the detected pipe is determined to be clogged. The seventh threshold is greater than the eighth threshold. When the detected pipe is determined to be normal, the aspirated smoke fire detector may broadcast and/or display "Normal" and may further send a normal state (for example, 1) to the master controller. When the detected pipe is determined to be broken, the aspirated smoke fire detector may broadcast and/or display "Broken" and may further send a breakage state (for example, 0) to the master controller. When the detected pipe is determined to be blocked, the aspirated smoke fire detector may broadcast and/or display "Blocked" and may further send a blockage state (for example, 00) to the master controller.

In some embodiments, the aspirated smoke fire detector 400 may perform high-/low-airflow fault alarm based on the airflow flow rate and report to the master controller. The aspirated smoke fire detector 400 may perform hierarchical fault alarm based on the airflow flow rate. The operations of performing fault alarm and hierarchical fault alarm based on the airflow flow rate may be performed by the controller in the aspirated smoke fire detector 400 and are similar or identical to the operations of performing fault alarm and hierarchical fault alarm performed by the controller C in the aforementioned examples, which will not be repeated herein.

The aspirated smoke fire detector in the present disclosure can sample the flow rate in the pipe in real time by using the airflow detection circuit described above to determine whether there is any breakage or blockage in the pipeline in the monitored region, thereby protecting the whole monitored region and enabling the detection results to be more stable and reliable.

In some embodiments, the aspirated smoke fire detector 400 includes a memory for storing the flow rate-duty cycle mapping table.

Figure 7:
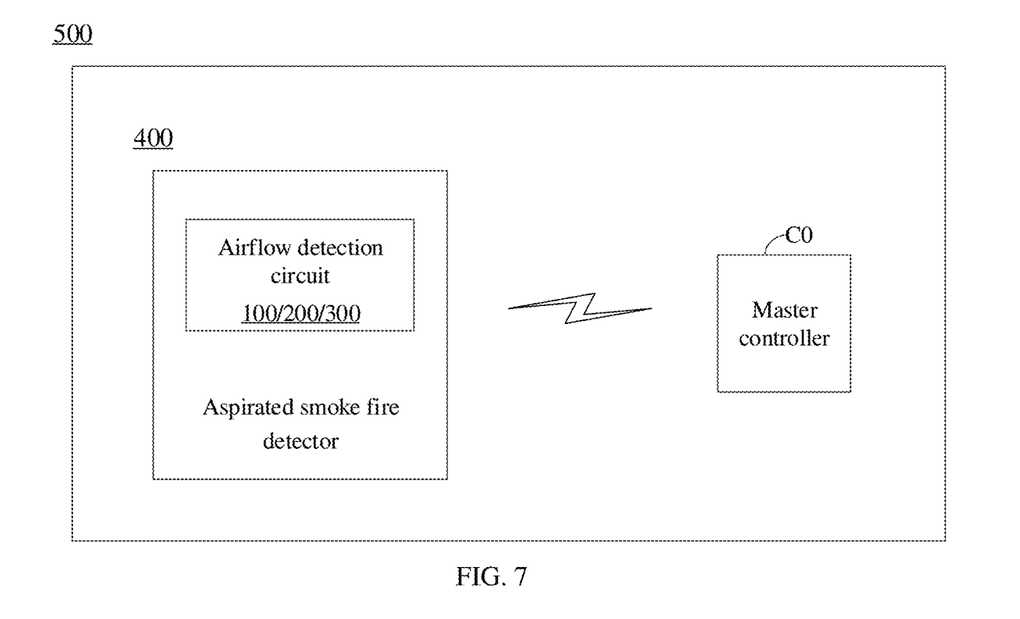
FIG. 7 shows a schematic diagram of a fire protection system according to some embodiments of the present disclosure.

The present disclosure further provides a fire protection system. FIG. 7 shows a schematic diagram of a fire protection system 500 according to some embodiments of the present disclosure. As shown in FIG. 7, the fire protection system 500 includes a master controller C0 and an aspirated smoke fire detector 400. The aspirated smoke fire detector 400 is communicatively connected to the master controller C0. The aspirated smoke fire detector 400 includes the airflow detection circuit 100/200/300 described above.

The aspirated smoke fire detector 400 may detect an airflow flow rate, determine the state of a detected pipe based on the airflow flow rate and report the state to the master controller C0. The master controller C0 may control the work of the aspirated smoke fire detector 400. For example, when the aspirated smoke fire detector 400 reports a normal state to the master controller C0, the master controller C0 may control the aspirated smoke fire detector 400 to work continuously. When the aspirated smoke fire detector 400 reports an abnormal state to the master controller C0, the master controller C0 may control the aspirated smoke fire detector 400 to suspend work.

The fire protection system in the present disclosure can achieve more stable and reliable airflow monitoring by using the aforementioned aspirated smoke fire detector 400.

Figure 8:
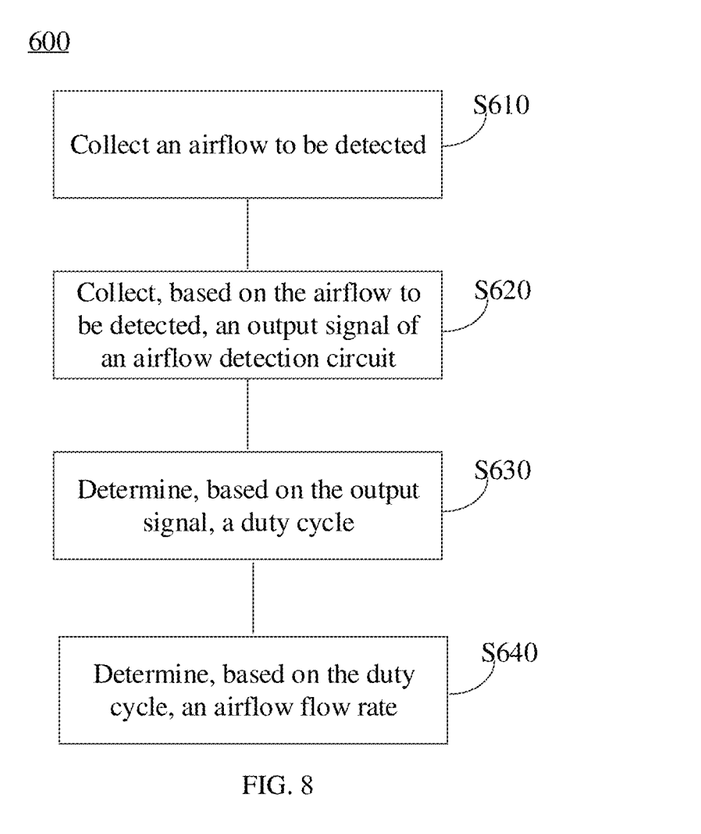
FIG. 8 shows a flowchart of an airflow detection method according to some embodiments of the present disclosure.

The present disclosure further provides an airflow detection method. FIG. 8 shows a flowchart of an airflow detection method 600 according to some embodiments of the present disclosure. As shown in FIG. 8, the airflow detection method 600 includes steps S610 to S640 and may be executed by the aspirated smoke fire detector 400.

In step S610, an airflow to be detected is collected. The aspirated smoke fire detector may draw air from a detected pipe into the detector through a sampling tube (aspirating tube).

In step S620, an output signal of an airflow detection circuit is collected based on the airflow to be detected. The aspirated smoke fire detector may sense a change in the temperature of the air drawn by the sampling tube through the first thermistor and the second thermistor of the airflow detection circuit, and collect the output signal of the first operational amplifier through the airflow detection circuit.

In step S630, a duty cycle is determined based on the output signal. The aspirated smoke fire detector may determine the duty cycle based on the output signal of the first operational amplifier.

In step S640, an airflow flow rate is determined based on the duty cycle. The aspirated smoke fire detector may determine the airflow flow rate according to the duty cycle-flow rate mapping table based on the duty cycle.

In some embodiments, the airflow detection method 600 further includes a step in which: the state of a detected pipe is determined based on the airflow flow rate, and the state is reported to the master controller. The aspirated smoke fire detector may determine the state of the detected pipe based on the airflow flow rate. For example, when the airflow flow rate is between the seventh threshold and the eighth threshold, the detected pipe is determined to be normal. When the airflow flow rate is higher than the seventh threshold, the detected pipe is determined to be cracked. When the airflow flow rate is lower than the eighth threshold, the detected pipe is determined to be clogged. When the detected pipe is determined to be normal, the aspirated smoke fire detector may send a normal state (for example, 1) to the master controller. When the detected pipe is determined to be broken, the aspirated smoke fire detector may send a high airflow (pipe cracking or breakage) state (for example, 0) to the master controller. When the detected pipe is determined to be clogged, the aspirated smoke fire detector may send a low airflow (pipe clogging or blockage) state (for example, 00) to the master controller. The master controller may receive the state of the detected pipe reported by the aspirated smoke fire detector and notify the relevant personnel timely. The aspirated smoke fire detector may also broadcast and/or display the detection result and notify the relevant personnel timely on its own.

In some embodiments, the airflow detection method 600 further includes a step in which: fault alarm is performed based on the airflow flow rate. In some embodiments, the airflow detection method 600 further includes a step in which: hierarchical fault alarm is performed based on the airflow flow rate. The performing of fault alarm and hierarchical fault alarm is similar or identical to that in the aforementioned description, which will not be repeated herein.

The present disclosure further provides a computer-readable storage medium including computer-executable instructions stored thereon, where the computer-executable instructions, when executed by a processor, cause the processor to perform the airflow detection method described above.

In some embodiments, the memory/computer-readable storage medium may be any tangible medium containing or storing a program. The program may be used by or used in conjunction with an instruction execution system, apparatus or device. The computer-readable storage medium includes, but is not limited to, an electronic, magnetic, optical, or semiconductor form or apparatus. A non-exhaustive list of more specific examples of the computer-readable storage medium includes: an electrical connection with one or more wires, a portable computer magnetic disk, a hard disk, a random-access memory (RAM), a non-volatile random access memory (NVRAM), a read-only memory (ROM), an erasable programmable read-only memory (EPROM, or a flash memory), an optical fiber, a portable compact disk read-only memory (CD-ROM), an optical memory device, a magnetic memory device, or any suitable combination thereof.

In some embodiments, the processor/controller/master controller may include a central processing unit (CPU) or a micro control unit (MCU), and may further include a general-purpose processor, a digital signal processor (DSP), an application-specific integrated circuit (ASIC), a field-programmable gate array (FPGA) or another programmable logic device, a discrete gate or transistor logic device, a discrete hardware component or another similar device.

It should be noted that although the present specification provides the operating steps of the method as described in the embodiments or the schematic diagrams, more or fewer operating steps may be included based on routine or non-inventive labor. The order of steps enumerated in an embodiment is only one of a plurality of orders in which the steps may be performed and does not represent the unique order of execution. When executed in the system or device product in practice, the steps may be executed sequentially or in parallel according to the methods shown in the embodiments or the flowcharts.

Finally, it should be noted that the above are merely preferred embodiments of the present disclosure and are not intended to limit the present disclosure. Although the present disclosure is described in detail with reference to the above-mentioned embodiments, those skilled in the art can still modify the technical schemes described in the above-mentioned embodiments, or make equivalent substitutions on some of the technical features therein.

Any modifications, equivalent substitutions, improvements and the like made within the spirit and principle of the present disclosure should fall within the scope of protection of the present disclosure.

The invention claimed is:

1. An airflow detection circuit, comprising:
   a first thermistor, wherein one terminal of the first thermistor is coupled to a first resistor and a first switch, and the other terminal of the first thermistor is coupled to a first input terminal of a first operational amplifier;
   a second thermistor, wherein one terminal of the second thermistor is coupled to the first resistor and the first switch, and the other terminal of the second thermistor is coupled to a second input terminal of the first operational amplifier;
   a voltage source, coupled to the first resistor and the first switch and configured to provide a supply voltage for the first thermistor and the second thermistor through a corresponding supply path based on ON or OFF of the first switch; and
   a controller, coupled to an output terminal of the first operational amplifier and configured to collect an output signal of the first operational amplifier and determine an airflow flow rate based on the output signal.

2. The airflow detection circuit according to claim 1, wherein when the first switch is OFF, the voltage source is configured to provide a supply voltage for the first thermistor and the second thermistor through the first resistor.

3. The airflow detection circuit according to claim 1, wherein when the first switch is ON, the voltage source is configured to provide a supply voltage for the first thermistor and the second thermistor through the first switch.

4. The airflow detection circuit according to claim 1, further comprising a second operational amplifier, wherein a first input terminal of the second operational amplifier is coupled to the first thermistor, and a second input terminal of the second operational amplifier is coupled to the second thermistor.

5. The airflow detection circuit according to claim 4, further comprising a second switch, wherein the second switch is coupled to an output terminal of the second operational amplifier and the first switch and configured to control the first switch to be ON or OFF based on an output signal of the second operational amplifier.

6. The airflow detection circuit according to claim 5, wherein the second switch is ON when the output signal of the second operational amplifier is higher than a first threshold; the first switch is ON when the second switch is ON.

7. The airflow detection circuit according to claim 5, wherein the second switch is OFF when the output signal of the second operational amplifier is lower than a second threshold; the first switch is OFF when the second switch is OFF.

8. The airflow detection circuit according to claim 5, wherein the first switch comprises a metal-oxide-semiconductor field-effect transistor, the second switch comprises a bipolar junction transistor, and a collector of the bipolar junction transistor is coupled to a gate of the first switch.

9. The airflow detection circuit according to claim 1, wherein the thermistor comprises a platinum resistance thermometer; the first thermistor comprises a PT100; the second thermistor comprises a PT1000.

10. The airflow detection circuit according to claim 1, wherein the controller is configured to determine a duty cycle of the output signal of the first operational amplifier and determine the airflow flow rate based on the duty cycle.

11. The airflow detection circuit according to claim 10, wherein the controller is configured to determine the airflow flow rate based on a duty cycle-flow rate mapping table.

12. The airflow detection circuit according to claim 10, wherein the controller is coupled to a master controller, and the controller is configured to determine a state of a detected pipe based on the airflow flow rate and feed the state back to the master controller.

13. The airflow detection circuit according to claim 5, further comprising a second resistor, a third resistor and a fourth resistor, wherein the second resistor is coupled to the first thermistor, the third resistor and the fourth resistor are connected in series and coupled to the second thermistor, and the second resistor, the third resistor and the fourth resistor meet the following relationship:

$$\frac{V_{CC} - V_{DS}}{R_{PT1} + T \times \Delta R_{PT1} + R2} \times R2 = \frac{V_{CC} - V_{DS}}{R_{PT2} + T \times \Delta R_{PT2} + R3 + R4} \times R4$$

wherein $V_{CC}$ denotes a voltage of the voltage source, $V_{DS}$ denotes an on-state voltage drop of the first switch, $R_{PT1}$ denotes a resistance of the first thermistor, $R_{PT2}$ denotes a resistance of the second thermistor, $\Delta R_{PT1}$ denotes a change in the resistance of the first thermistor with temperature, $\Delta R_{PT2}$ denotes a change in the resistance of the second thermistor with temperature, T denotes a temperature, R2 denotes a resistance of the second resistor, R3 denotes a resistance of the third resistor, and R4 denotes a resistance of the fourth resistor.

14. The airflow detection circuit according to claim 13, further comprising a fifth resistor, a sixth resistor, a seventh resistor, an eighth resistor, a ninth resistor, a tenth resistor and an eleventh resistor, wherein one terminal of the fifth resistor is coupled to the first resistor and the first switch, and the other terminal of the fifth resistor is coupled to a collector of the second switch; one terminal of the sixth resistor is coupled to the output terminal of the second operational amplifier, and the other terminal of the sixth resistor is coupled to a base of the second switch; one terminal of the seventh resistor is coupled between the sixth resistor and the base of the second switch, and the other terminal of the seventh resistor is coupled to an emitter of the second switch; one terminal of the eighth resistor is coupled to the output terminal of the first operational amplifier, and the other terminal of the eighth resistor is coupled to the controller; one terminal of the ninth resistor is coupled between the eighth resistor and the controller, and the other terminal of the ninth resistor is grounded; one terminal of the tenth resistor is coupled to the second input terminal of the first operational amplifier, and the other terminal of the tenth resistor is coupled between the output terminal of the first operational amplifier and the eighth resistor; one terminal of the eleventh resistor is coupled to the second input terminal of the first operational amplifier, and the other terminal of the eleventh resistor is grounded.

15. The airflow detection circuit according to claim 14, further comprising a first capacitor, a second capacitor, a third capacitor and a fourth capacitor, wherein one terminal of the first capacitor is coupled between the first thermistor and the first input terminal of the second operational amplifier, and the other terminal of the first capacitor is coupled to the emitter of the second switch; one terminal of the second capacitor is coupled between the third resistor and the fourth resistor and coupled to the second input terminal of the second operational amplifier, and the other terminal of the second capacitor is coupled to the emitter of the second switch; the third capacitor is coupled in parallel to the seventh resistor, one terminal of the third capacitor is coupled to the base of the second switch, and the other terminal of the third capacitor is coupled to the emitter of the second switch; the fourth capacitor is coupled in parallel to the ninth resistor, and the other terminal of the fourth capacitor is grounded.

16. An aspirated smoke fire detector, comprising an airflow detection circuit, the airflow detection circuit comprising:
a first thermistor, wherein one terminal of the first thermistor is coupled to a first resistor and a first switch, and the other terminal of the first thermistor is coupled to a first input terminal of a first operational amplifier;
a second thermistor, wherein one terminal of the second thermistor is coupled to the first resistor and the first switch, and the other terminal of the second thermistor is coupled to a second input terminal of the first operational amplifier;
a voltage source, coupled to the first resistor and the first switch and configured to provide a supply voltage for the first thermistor and the second thermistor through a corresponding supply path based on ON or OFF of the first switch; and
a controller, coupled to an output terminal of the first operational amplifier and configured to collect an output signal of the first operational amplifier and determine an airflow flow rate based on the output signal.

17. The aspirated smoke fire detector according to claim 16, wherein when the first switch is OFF, the voltage source is configured to provide a supply voltage for the first thermistor and the second thermistor through the first resistor.

18. An airflow detection method, comprising:

collecting an airflow to be detected;

collecting, based on the airflow to be detected, an output signal of an airflow detection circuit;

determining, based on the output signal, a duty cycle; and determining, based on the duty cycle, an airflow flow rate;

wherein the airflow detection method is performed by an aspirated smoke fire detector, wherein the aspirated smoke fire detector comprises an airflow detection circuit, the airflow detection circuit comprising:

a first thermistor, wherein one terminal of the first thermistor is coupled to a first resistor and a first switch, and the other terminal of the first thermistor is coupled to a first input terminal of a first operational amplifier;

a second thermistor, wherein one terminal of the second thermistor is coupled to the first resistor and the first switch, and the other terminal of the second thermistor is coupled to a second input terminal of the first operational amplifier;

a voltage source, coupled to the first resistor and the first switch and configured to provide a supply voltage for the first thermistor and the second thermistor through a corresponding supply path based on ON or OFF of the first switch; and a controller, coupled to an output terminal of the first operational amplifier and configured to collect an output signal of the first operational amplifier and determine an airflow flow rate based on the output signal.

19. The airflow detection method according to claim 18, further comprising: determining a state of a detected pipe based on the airflow flow rate and reporting the state to a master controller.

20. The airflow detection method according to claim 18, wherein when the first switch is OFF, the voltage source is configured to provide a supply voltage for the first thermistor and the second thermistor through the first resistor.

* * * * *